(12) United States Patent
Chu et al.

(10) Patent No.: US 8,861,573 B2
(45) Date of Patent: Oct. 14, 2014

(54) TRANSCEIVER CAPABLE OF DYNAMICALLY ADJUSTING TRANSMITTER CLOCK AND RELATED METHOD THEREOF

(75) Inventors: Yuan-Jih Chu, Hsinchu (TW);
Liang-Wei Huang, Hsinchu (TW);
Ching-Yao Su, Taichung (TW);
Ming-Feng Hsu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 62 days.

(21) Appl. No.: 13/615,504

(22) Filed: Sep. 13, 2012

(65) Prior Publication Data
US 2013/0100990 A1     Apr. 25, 2013

(30) Foreign Application Priority Data
Oct. 21, 2011   (TW) .............. 100138392 A (51) Int. Cl.
*H04B 1/38*   (2006.01)
*H04L 5/16*   (2006.01)
*H04L 7/00*   (2006.01)

(52) U.S. Cl.
CPC ............. *H04L 7/0091* (2013.01); *H04L 7/0004* (2013.01); *H04L 7/0062* (2013.01)
USPC .......................................... 375/219; 375/259

(58) Field of Classification Search
CPC ........ H03L 7/00; H04B 2001/38; H04B 1/38; H04B 1/40; H04L 7/00; H04L 7/0012; H04L 2007/00
USPC ......... 375/219, 344, 354, 355, 362, 375, 377, 375/259; 370/503
See application file for complete search history.

(56) References Cited

U.S. PATENT DOCUMENTS

| | | | |
|---|---|---|---|
| 6,625,743 B1 * | 9/2003 | Gulick | 713/400 |
| 7,864,912 B1 * | 1/2011 | Wu et al. | 375/375 |
| 8,014,440 B2 * | 9/2011 | Hsiao | 375/220 |
| 8,185,720 B1 * | 5/2012 | Ansari et al. | 712/28 |
| 2005/0034009 A1 * | 2/2005 | Sutardja et al. | 713/503 |
| 2006/0215782 A1 * | 9/2006 | Ahmed et al. | 375/272 |
| 2006/0251126 A1 * | 11/2006 | Jen | 370/503 |
| 2008/0118015 A1 * | 5/2008 | Wilson et al. | 375/358 |
| 2011/0043694 A1 * | 2/2011 | Izuno et al. | 348/515 |
| 2012/0049909 A1 * | 3/2012 | Lin | 327/156 |

* cited by examiner

Primary Examiner — Jean B Corrielus
(74) Attorney, Agent, or Firm — Winston Hsu; Scott Margo (57) ABSTRACT

A transceiver for dynamically adjusting a transmission clock includes: a transmitting unit, a receiving unit, and a transmission clock tracking unit. The transmitting unit is arranged for transmitting a transmission signal according to the transmission clock. The receiving unit is arranged for receiving a reception signal. The transmission clock tracking unit is coupled to the transmitting unit and the receiving unit, and arranged for dynamically controlling the transmission clock of the transmitting unit according to a reception clock corresponding to the reception signal.

9 Claims, 7 Drawing Sheets

TRANSCEIVER CAPABLE OF DYNAMICALLY ADJUSTING TRANSMITTER CLOCK AND RELATED METHOD THEREOF

BACKGROUND OF THE INVENTION

1. Field of the Invention

The disclosed embodiments of the present invention relate to a transceiver of a communication system, and more particularly, to a transceiver capable of dynamically adjusting a transmitter clock and a related method thereof.

2. Description of the Prior Art

In a gigabit Ethernet network specification, it is stated that a master mode should be coordinated/defined at one terminal as for a slave mode at the other terminal before the data transmission is started. Such a rule may allow both terminals to operate at the same frequency during the transmission. That is, frequency of a transmission signal generated from communication equipment operating in the master mode is fixed; and frequency of a transmission signal generated from communication equipment operating in the slave mode is the same as frequency of a reception signal (i.e., the frequency of the transmission signal from the communication equipment operating in the master mode). However, the specification of some full-duplex systems employing the same line pair for transmission and reception, e.g., a high definition multimedia interface (HDMI) 1.4 specification, lacks the mechanism of coordinating master/slave mode in advance. When the frequency of transmission is not the same with the frequency of reception, complexity of hardware design rises inevitably.

Therefore, no matter whether there is a mechanism for coordinating the master/slave mode or not, how to simplify the hardware design while maintaining the normal transmission functionality has become a problem needed to be solved for those skilled in the art.

SUMMARY OF THE INVENTION

In accordance with exemplary embodiments of the present invention, a transceiver capable of dynamically adjusting a transmitter clock and a related method are proposed to solve the above-mentioned problem.

According to a first aspect of the present invention, an exemplary transceiver for adjusting a transmitter clock is disclosed. The exemplary transceiver includes a transmission, a reception unit and a transmitter clock tracking unit. The transmission unit is arranged for transmitting a transmission signal according to the transmitter clock. The reception unit is arranged for receiving a reception signal, and generating a receiver clock according to the reception signal. The transmitter clock tracking unit is coupled to the transmission unit and the reception unit. The transmitter clock tracking unit includes a configuration unit. The configuration unit stores a clock threshold bound, and the transmitter clock tracking unit controls a frequency of the transmitter clock of the transmission unit according to the receiver clock and the clock threshold bound. The frequency of the transmitter clock is within the clock threshold bound.

According to a second aspect of the present invention, an exemplary method for adjusting a transmitter clock of a transceiver is disclosed. The exemplary method includes transmitting a transmission signal according to the transmitter clock; receiving a reception signal and accordingly generating a receiver clock; and dynamically controlling a frequency of the transmitter clock according to the receiver clock of the reception signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
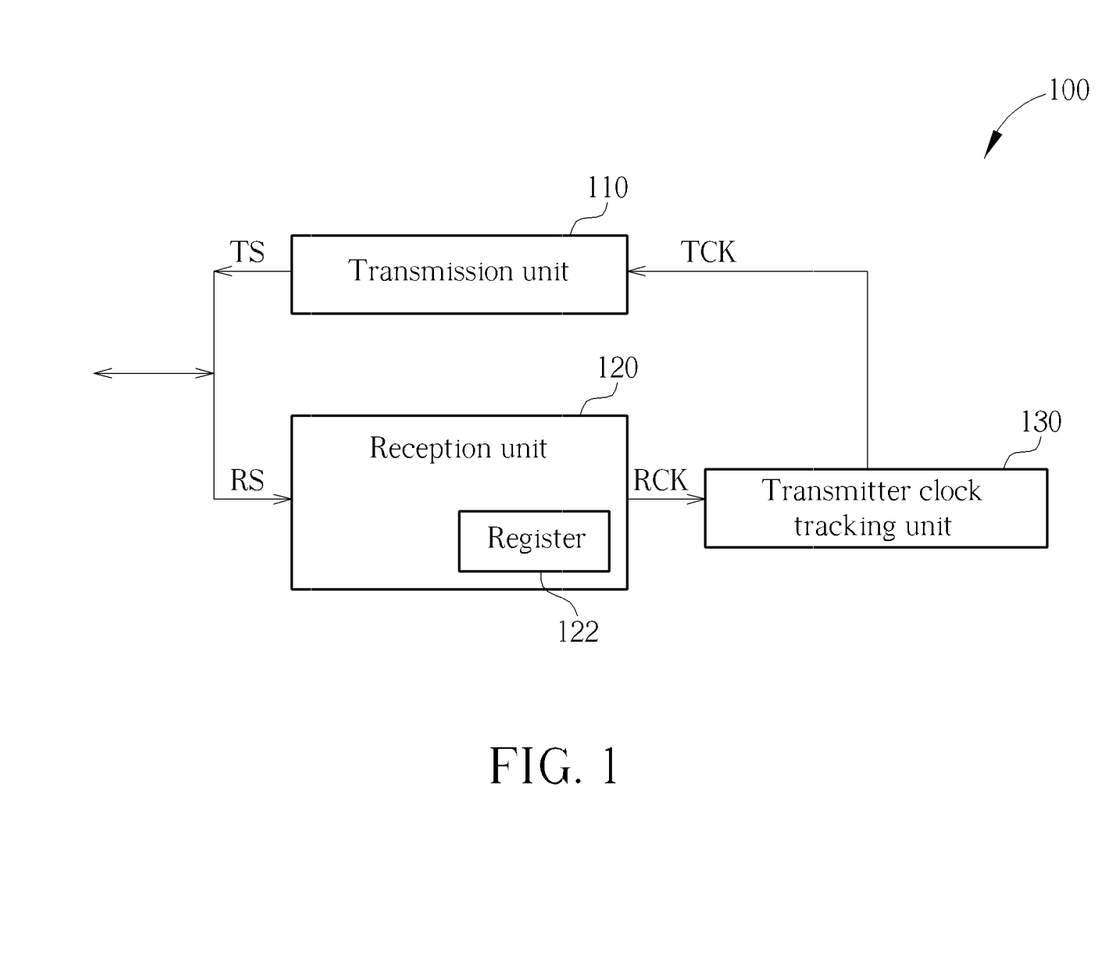
FIG. 1 is a schematic diagram illustrating a transceiver capable of dynamically controlling a transmitter clock according to an embodiment of the present invention.

Please refer to FIG. 1, which is a schematic diagram illustrating a transceiver 100 capable of dynamically controlling a transmitter clock TCK according to an embodiment of the present invention. As shown in FIG. 1, the transceiver 100 includes, but not limited to, a transmission unit 110, a reception unit 120 and a transmitter clock tracking unit 130. The transmission unit 110 transmits a transmission signal TS according to the transmitter clock TCK, the reception unit 120 is arranged for receiving a reception signal RS to generate a receiver clock RCK, and a value of frequency of the receiver clock RCK may be stored in a register 122. Please note that, the register 122 is disposed in a timing recovery (TR) circuit of the reception unit 120. In addition, the transmitter clock tracking unit 130 is coupled to the transmission unit 110 and the reception unit 120, and dynamically controls the frequency of the transmitter clock TCK of the transmission unit 110 according to the receiver clock RCK of the reception signal RS.

Figure 2A:
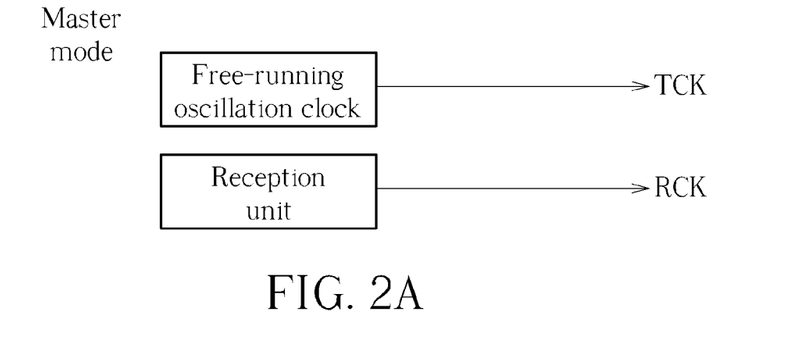
FIG. 2A is a schematic diagram illustrating the transceiver shown in FIG. 1 operating in a master mode.
Figure 2B:
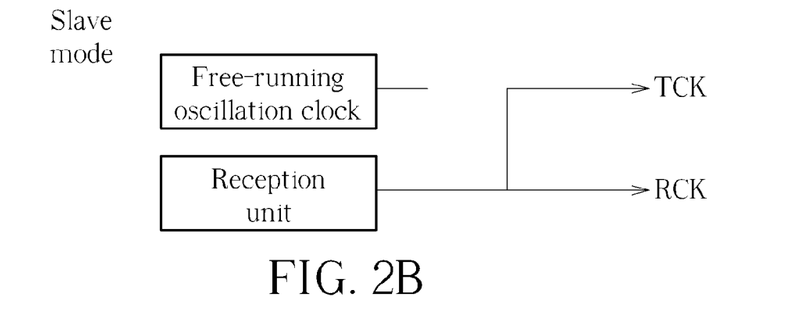
FIG. 2B is a schematic diagram illustrating the transceiver shown in FIG. 1 operating in a slave mode.
Figure 2C:
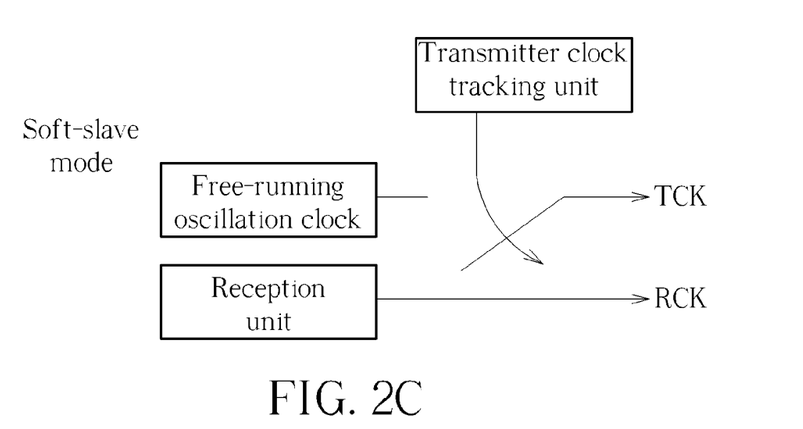
FIG. 2C is a schematic diagram illustrating the transceiver shown in FIG. 1 operating in a soft-slave mode.

The transceiver 100 of the present invention may operate in a different working mode to collaborate with communication equipment at the other terminal that operates in a designated working mode. Therefore, the transceiver 100 of the present invention may be applied to different transmission interfaces. Please refer to FIG. 2A, which is a schematic diagram illustrating the transceiver shown in FIG. 1 operating in a master mode (transmitter clock TCK and receiver clock RCK) according to an exemplary example of the present invention. That is, the equipment at the other terminal is operated in a slave mode. In other words, under such a configuration, frequency of the transmitter clock TCK issued by the transmission unit of the transceiver 100 of the present invention is fixed. FIG. 2B is a schematic diagram illustrating the transceiver shown in FIG. 1 operating in a slave mode (transmitter clock TCK and receiver clock RCK). That is, the equipment at the other terminal is operated in a master mode. Under such a configuration, frequency of the transmitter clock TCK issued by the transmission unit of the transceiver 100 of the present invention is the same as frequency of the receiver clock RCK of the reception unit. FIG. 2C is a schematic diagram illustrating the transceiver shown in FIG. 1 operating in a soft-slave mode (transmitter clock TCK and receiver clock RCK). Please note that, as shown in FIG. 2C, when the transceiver is operated in the soft-slave mode, the transmitter clock TCK may be either the receiver clock RCK or a well-defined free-running oscillation clock, which is determined by the transmitter clock tracking unit 130. In other words, under the soft-slave mode, the transmitter clock tracking unit 130 may dynamically switch the transmitter clock TCK of the transmission unit. In another embodiment, if the transceiver 100 of the present invention is applied to a system having no master/slave mode mechanism, the transceiver 100 of the present invention will function normally if being operated in the soft-slave mode.

Figure 3:
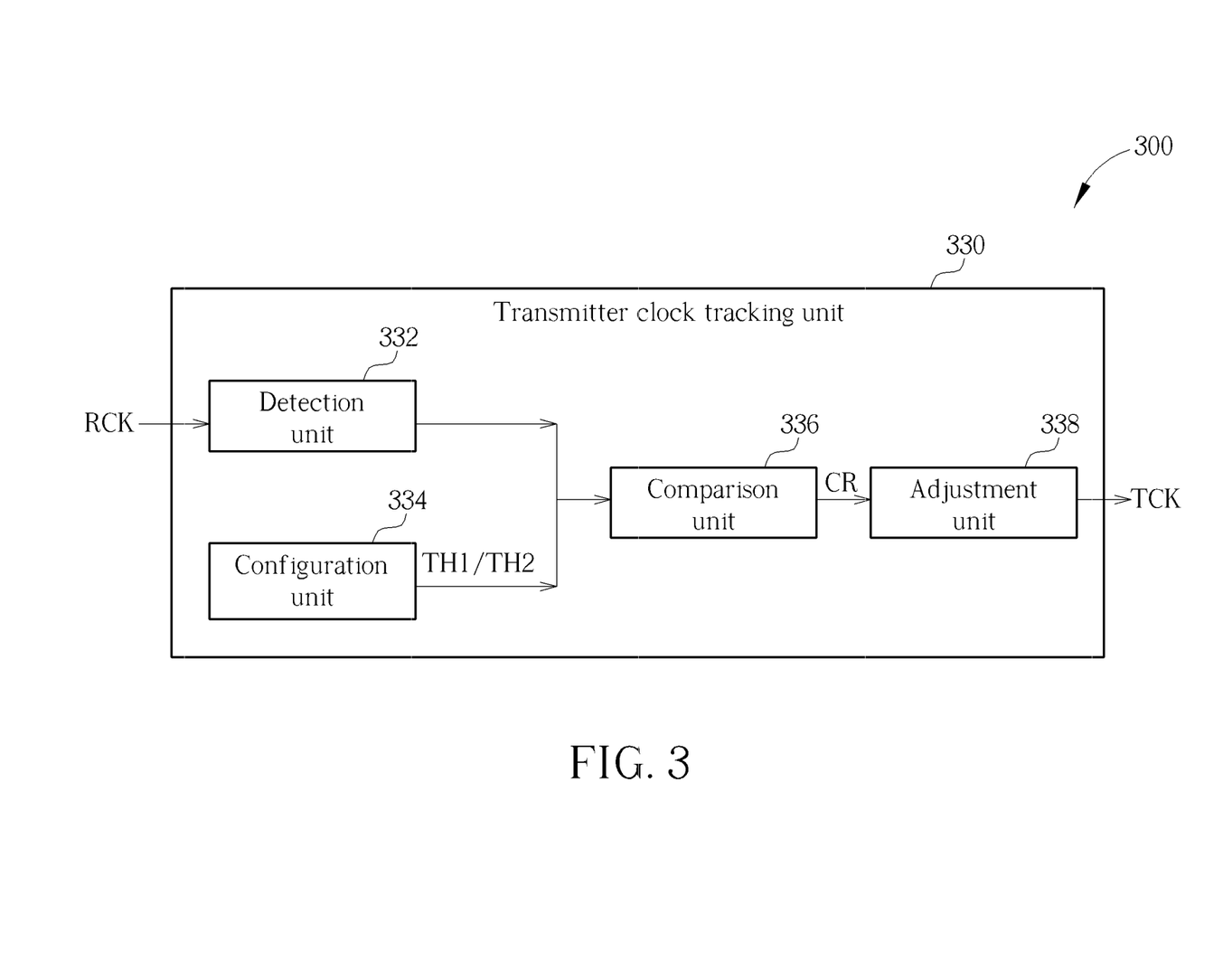
FIG. 3 is a schematic diagram illustrating an example of the transmitter clock tracking unit shown in FIG. 1.

Please refer to FIG. 3, which is a schematic diagram illustrating an exemplary example of the transmitter clock tracking unit shown in FIG. 1. As shown in FIG. 3, the transmitter clock tracking unit 330 includes a detection unit 332, a configuration unit 334, a comparison unit 336 and an adjustment unit 338. The detection unit 332 is arranged for detecting the frequency of the receiver clock RCK of the reception signal RS. The configuration unit 334 is arranged for configuring a first clock threshold TH1 and a second clock threshold TH2, wherein the first clock threshold TH1 is higher than the second clock threshold TH2. The comparison unit 336 is coupled to the detection unit 332 and the configuration unit 334, and arranged for comparing the frequency of the receiver clock RCK with the first clock threshold TH1 and the second clock threshold TH2 to generate a comparison result CR. When the comparison result CR indicates that the frequency of the receiver clock RCK is higher than the first clock threshold TH1, the adjustment unit 338 adjusts the frequency of the transmitter clock TCK to the first clock threshold TH1 or a frequency value around the first clock threshold TH1; when the comparison result CR indicates that the frequency of the receiver clock RCK is lower than the second clock threshold TH2, the adjustment unit 338 adjusts the frequency of the transmitter clock TCK to the second clock threshold TH2 or a frequency value around the second clock threshold TH2; and when the comparison result CR indicates that the frequency of the receiver clock RCK is between the first clock threshold TH1 and the second clock threshold TH2, the adjustment unit 338 adjusts the frequency of the transmitter clock TCK to the frequency of the receiver clock RCK such that the frequency of the transmitter clock TCK tracks the frequency of the receiver clock RCK.

Figure 4:
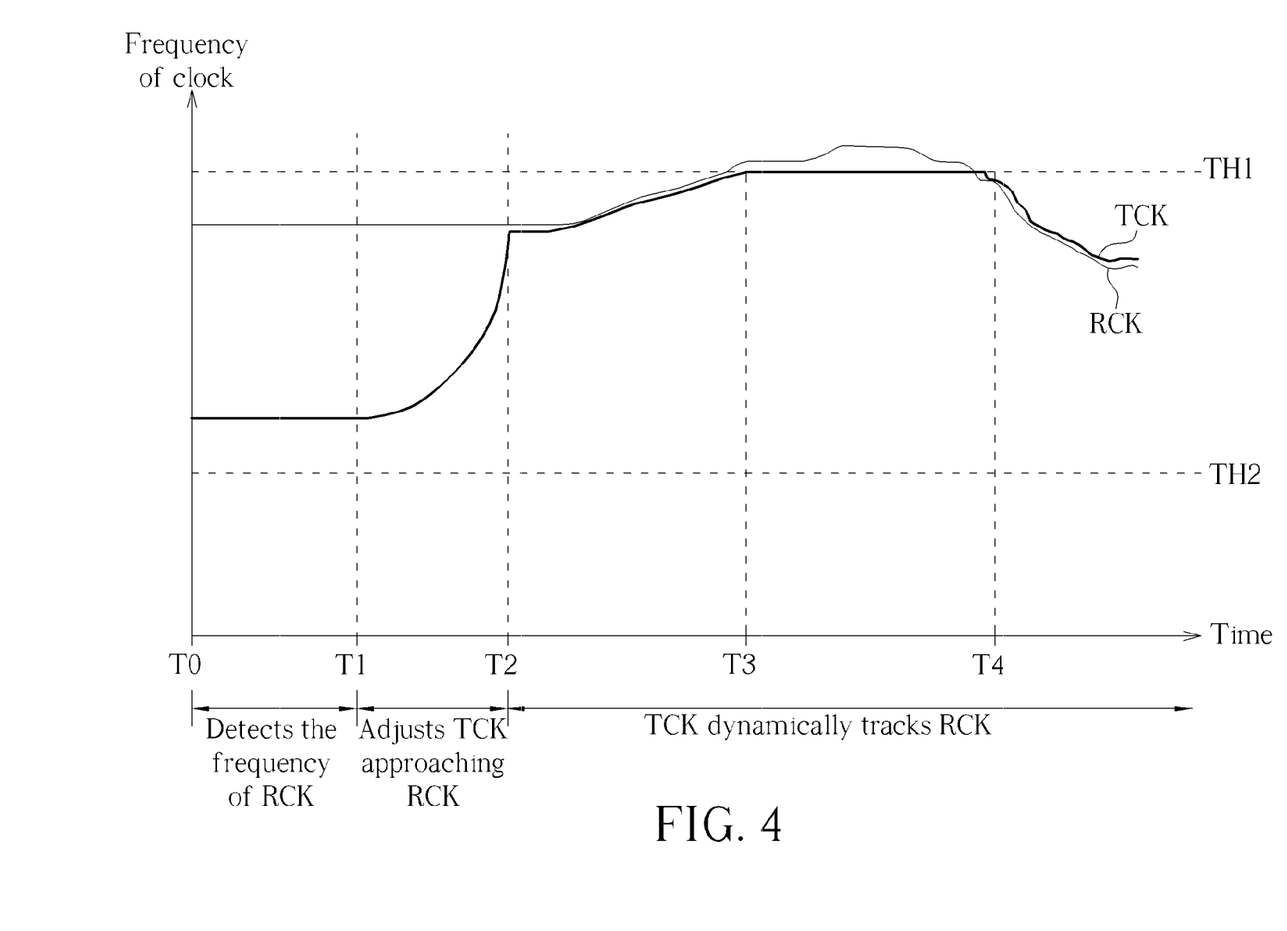
FIG. 4 is a schematic diagram illustrating operations of the transmitter clock tracking unit shown in FIG. 3.

Please refer to FIG. 4, which is a schematic diagram illustrating operations of the transmitter clock tracking unit 330. At time T0, the detection unit 332 detects the frequency of the receiver clock RCK of the reception signal RS. At time T1, the adjustment unit 338 adjusts the frequency of the transmitter clock TCK to approach the frequency of the receiver clock RCK. At time T2, the frequency of the transmitter clock TCK dynamically tracks the frequency of the receiver clock RCK. Please note that, during the time period between T2 and T3, since the frequency of the receiver clock RCK is in between the first clock threshold TH1 and the second clock threshold TH2, the adjustment unit 338 adjusts the frequency of the transmitter clock TCK to the frequency of the receiver clock RCK such that the frequency of the transmitter clock TCK tracks the frequency of the receiver clock RCK. During the time period between T3 and T4, the frequency of the receiver clock RCK is higher than the first clock threshold TH1, and thus the adjustment unit 338 keeps adjusting the frequency of the transmitter clock TCK to the first clock threshold TH1 until time T4. After that, since the frequency of the receiver clock RCK is once again in between the first clock threshold TH1 and the second clock threshold TH2, the adjustment unit 338 adjusts the frequency of the transmitter clock TCK to the frequency of the receiver clock RCK such that the frequency of the transmitter clock TCK tacks the frequency of the receiver clock RCK.

In one embodiment, the transceiver 100 may be applied to an HDMI interface. The transceiver 100 may communicate with a network device via the HDMI interface, wherein the network device may be operated in a master mode, a slave mode or a soft-slave mode. For example, when the network device is operated in the master mode and the transceiver 100 is operated in the soft-slave mode, since the frequency of the transmitter clock TCK of the network device is fixed, the frequency of the receiver clock RCK of the transceiver 100 may retain synchronized with the frequency of the transmitter clock TCK of the network device, and the frequency of the transmitter clock TCK of the transceiver 100 will also be the same as the frequency of the receiver clock RCK of the transceiver 100 due to dynamic frequency tracking. When the network device is operated in the slave mode and the transceiver 100 is operated in the soft-slave mode, frequency of the overall system may appear sloshing due to lacking of a frequency reference. However, frequency of the overall system will converge within the configured range due to dynamic frequency tracking of the transceiver 100 that constrains the frequency of the transmitter clock TCK. When the network device is operated in the soft-slave mode and the transceiver 100 is operated in the soft-slave mode, the situation will be the same as the situation where the network device is operated in the slave mode. The frequency of the overall system will converge within the configured range due to frequency adjustments from both terminals to make frequencies equal to each other.

Figure 5:
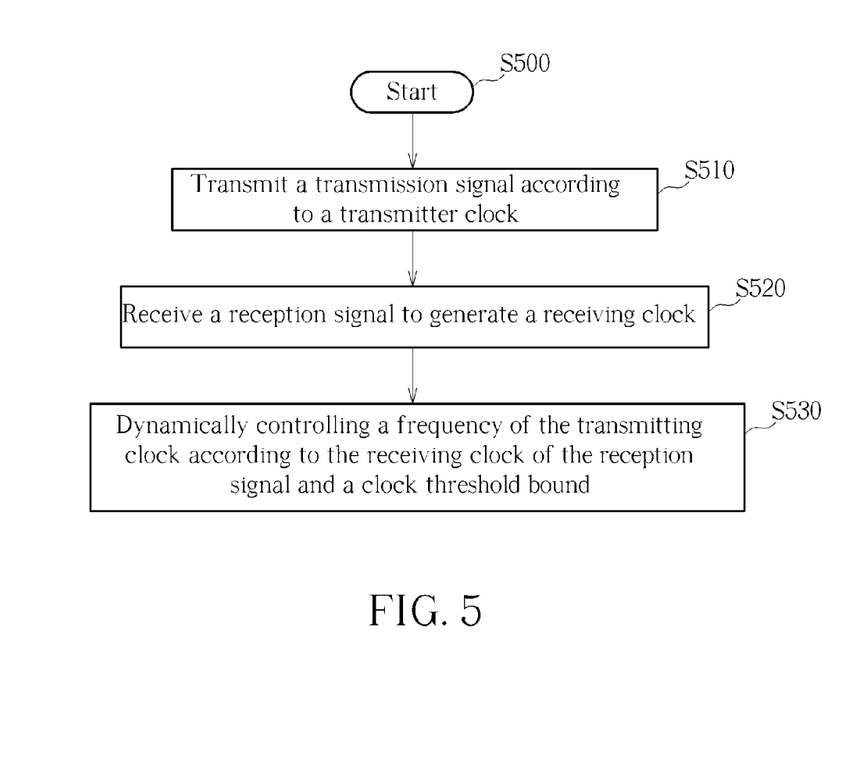
FIG. 5 is a flowchart illustrating an exemplary method of dynamically controlling a transmitter clock of a transceiver according to an embodiment of the present invention.

Please refer to FIG. 5, which is a flowchart illustrating an exemplary method of dynamically controlling a transmitter clock of a transceiver according to an embodiment of the present invention. The method includes (but not limited to) the following steps. Please note that, if the result is substantially the same, the steps are not required to be executed in the exact order shown in FIG. 5.

Step S510: Transmit a transmission signal according to a transmitter clock.

Step S520: Receive a reception signal to generate a receiver clock.

Step S530: Dynamically control frequency of the transmitter clock according to the receiver clock of the reception signal.

As a person skilled in the art can readily understand operations of the steps shown in FIG. 5 after reading above paragraphs with reference elements shown in FIG. 1, further description is omitted here for the sake of brevity.

Figure 6:
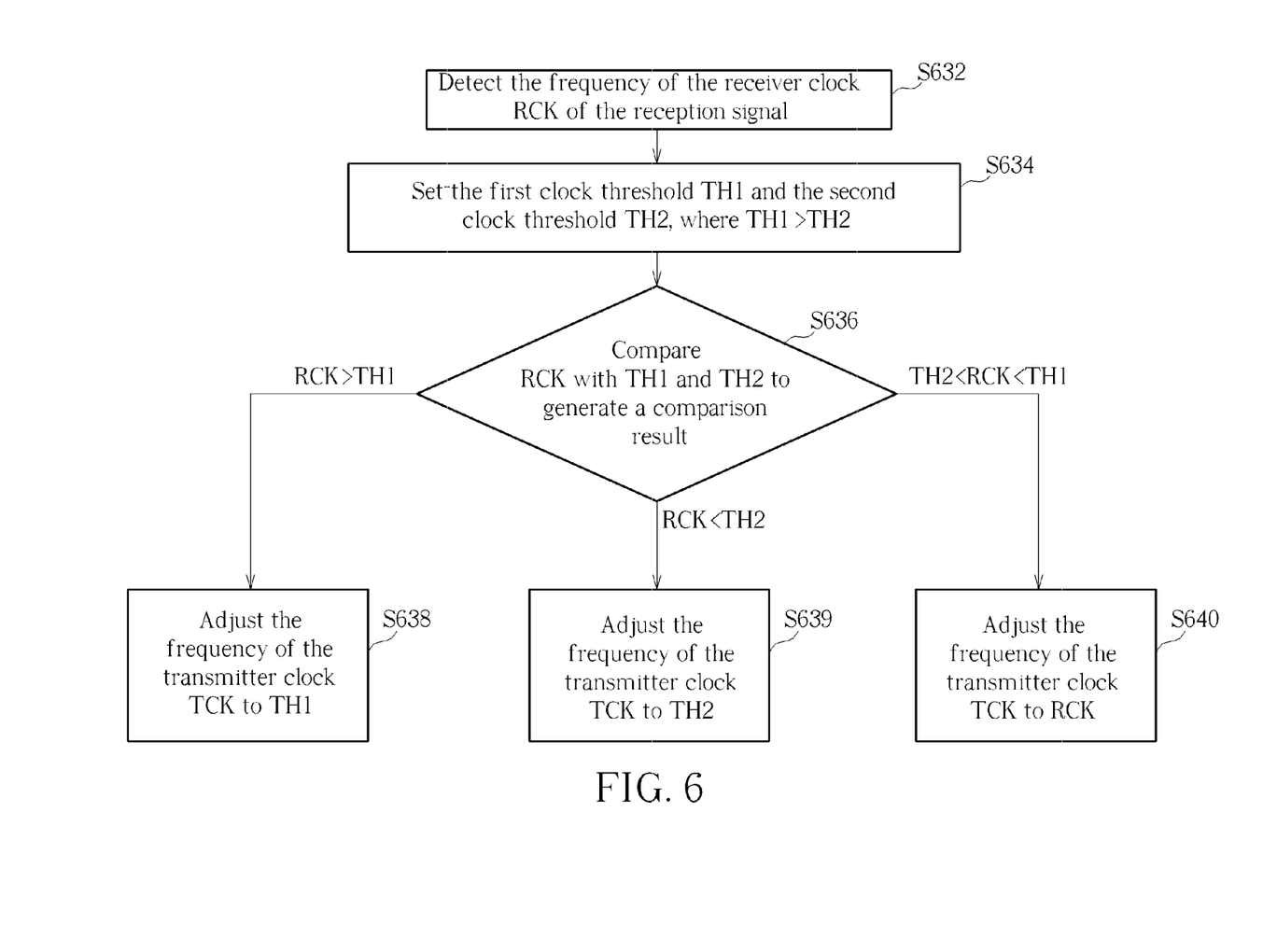
FIG. 6 is a flowchart of an example of the step S530 shown in FIG. 5.

Please refer to FIG. 6, which is a flowchart of an example of the step S530 shown in FIG. 5. The step S530 includes (but not limited to) steps shown in FIG. 6. Please note that, if the result is substantially the same, the steps are not required to be executed in the exact order shown in FIG. 6.

Step S632 may be executed by the detection unit 332, step S634 may be executed by the configuration unit 334, steps S636 may be executed by the comparison unit 336, and step S638, S639, S640 may be executed by the adjustment unit 338. As a person skilled in the art can readily understand operations of the steps shown in FIG. 6 after reading above paragraphs with reference to the elements shown in FIG. 3, further description is omitted here for the sake of brevity.

Figure 7:
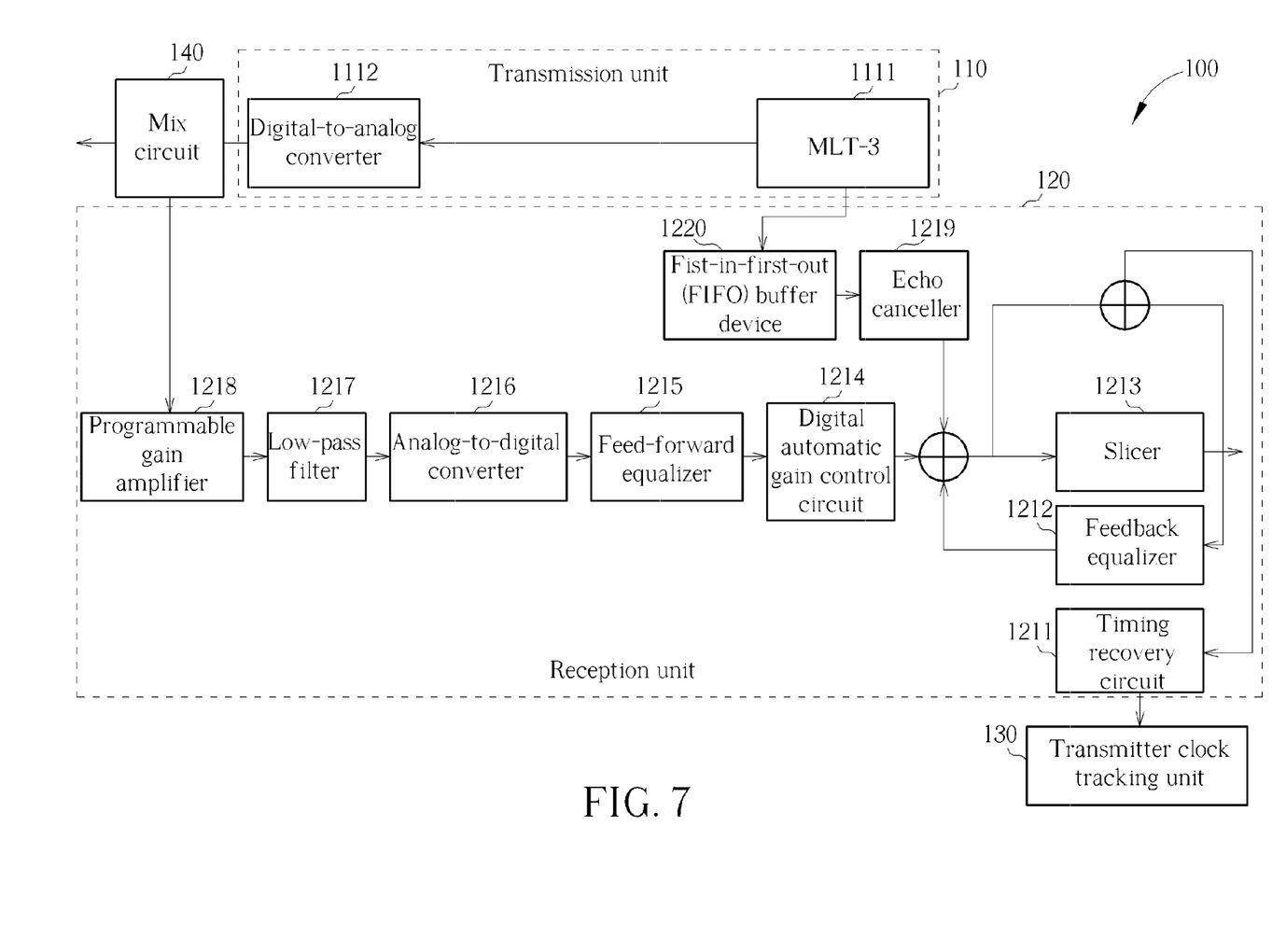
FIG. 7 is a schematic diagram illustrating the transceiver shown in FIG. 1 applied to a physical layer circuit conforming to an HDMI 1.4 specification according to an embodiment of the present invention.

FIG. 7 is a schematic diagram illustrating the transceiver 100 applied to a physical layer (PHY) circuit conforming to the HDMI 1.4 specification according to an embodiment of the present invention. The transceiver 100 includes the transmission unit 110, the reception unit 120, the clock tracking unit 130 and a mix circuit 140. The transmission unit 110 and the reception unit 120 both conform to physical layer related specification as defined in HDMI 1.4. Therefore, if the transceiver 100 of the present invention is applied to other interfaces, the transmission unit 110 and the reception unit 120 should be adjusted accordingly. In other words, detailed implementations of the transmission unit 110 and the reception unit 120 are for illustrative purposes only, and are not meant to be limitations of the present invention. Circuit diagrams of circuits applied to other interfaces may be acquired by referring to other related specifications. In this embodiment, the transmission unit 110 includes a multi-level transmit encoder (MLT-3) 1111 and a digital-to-analog converter 1112. The reception unit 120 shown in FIG. 7 includes a timing recovery circuit 1211, a feedback equalizer 1212, a slicer 1213, a digital automatic gain control circuit 1214, a feed-forward equalizer 1215, a analog-to-digital converter 1216, a low-pass filter 1217, a programmable gain amplifier 1218, an echo canceller 1219, and a fist-in-first-out (FIFO) buffer device 1220. The clock tracking unit 130 may dynamically control the frequency of the transmitter clock of the transmission unit 110 according to the frequency of the reception signal of the reception unit 120.

In addition, the present invention may avoid a case where the overall operating frequency may diverge due to channel interference or other factors when both terminals are operated in a situation that the frequency of the transmitter clock TCK is the same as the frequency of the receiver clock RCK. In addition, the present invention has high compatibility, i.e., the present invention is compatible with a device which the reception device is connected to no matter whether the device operates in a master mode, a slave mode or a soft-slave mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver for adjusting a transmitting clock, the transceiver comprising:
    a transmission unit, for transmitting a transmission signal according to the transmitter clock;
    a reception unit, for receiving a reception signal, and generating a receiving clock according to the reception signal; and
    a transmitting clock tracking unit, coupled to the transmission unit and the reception unit, wherein the transmitting clock tracking unit comprises a configuration unit, the configuration unit stores a clock threshold bound, and the transmitting clock tracking unit controls a frequency of the transmitting clock of the transmission unit according to the receiving clock and the clock threshold bound;
    wherein the frequency of the transmitting clock is within the clock threshold bound, and the clock threshold bound comprises a first clock threshold and a second clock threshold, and the first clock threshold is greater than the second clock threshold; the transceiver adjusts the frequency of the transmitting clock to the first clock threshold when a frequency of the receiving clock is higher than first clock threshold; the transceiver adjusts the frequency of the transmitting clock to the second clock threshold when the frequency of the receiving clock is lower than the second clock threshold; and the transceiver tracks the frequency of the receiving clock to adjust the frequency of the transmitting clock when the frequency of the receiving clock is in within the clock threshold bound.

2. The transceiver of claim 1, wherein the transceiver has three operating modes, including a master mode, a slave mode and a soft-slave mode.

3. The transceiver of claim 2, wherein the transceiver performs data transmission with a device through a high definition multimedia interface (HDMI).

4. The transceiver of claim 1, wherein the reception unit includes a register arranged for storing a value of the frequency of the transmitting clock.

5. A method for adjusting a transmitting clock of a transceiver, the method comprising:
    transmitting a transmission signal according to the transmitting clock;
    receiving a reception signal and accordingly generating a receiving clock;
    detecting a frequency of the receiving clock of the reception signal;
    configuring a first clock threshold and a second clock threshold, wherein the first clock threshold is greater than the second clock threshold; and
    adjusting a frequency of the transmitting clock to the first clock threshold when the frequency of the receiving clock is higher than the first clock threshold; adjusting the frequency of the transmitting clock to the second clock threshold when the frequency of the receiving clock is lower than the second clock threshold; and tracking the frequency of the receiving clock to adjust the frequency of the transmitting clock when the frequency of the receiving clock is within a clock threshold bound.

6. The method of claim 5, wherein the transceiver has three operating modes, including a master mode, a slave mode and a soft-slave mode.

7. The method of claim 6, wherein when operating under the soft-slave mode, the transceiver dynamically switches the frequency of the transmitting clock.

8. The method of claim 5, wherein the transceiver performs data transmission with a device through a high definition multimedia interface (HDMI).

9. The method of claim 5, wherein the step of receiving the reception signal and accordingly generating the receiving clock comprises:
    storing a value of the frequency of the transmitting clock.

* * * * *